Aug. 22, 1933.                E. SCOFIELD                1,923,752
COMBINED FORMING AND FINISHING MECHANISM
Original Filed June 8, 1926    4 Sheets-Sheet 1
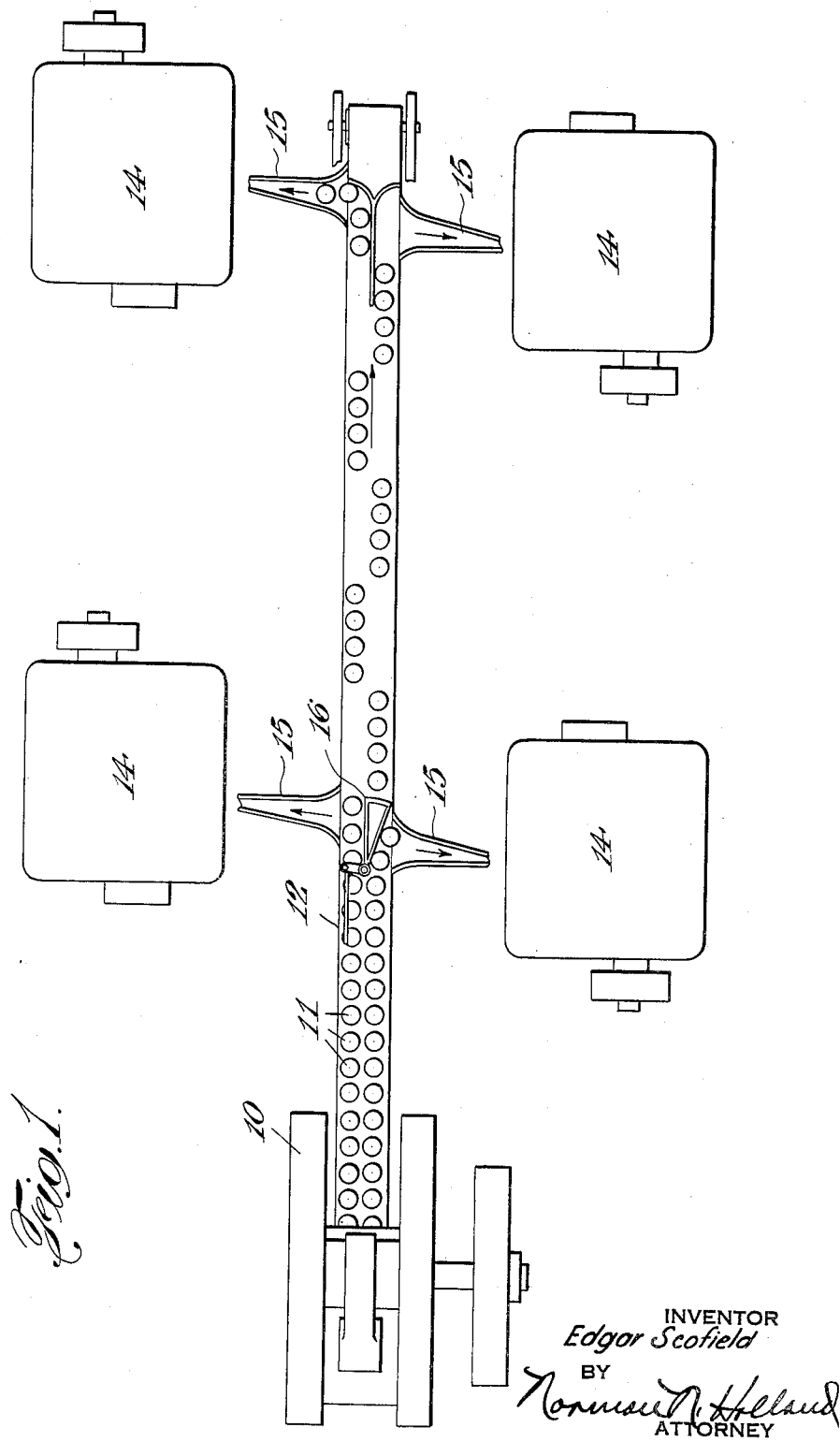

Aug. 22, 1933.  E. SCOFIELD  1,923,752
COMBINED FORMING AND FINISHING MECHANISM
Original Filed June 8, 1926   4 Sheets-Sheet 2
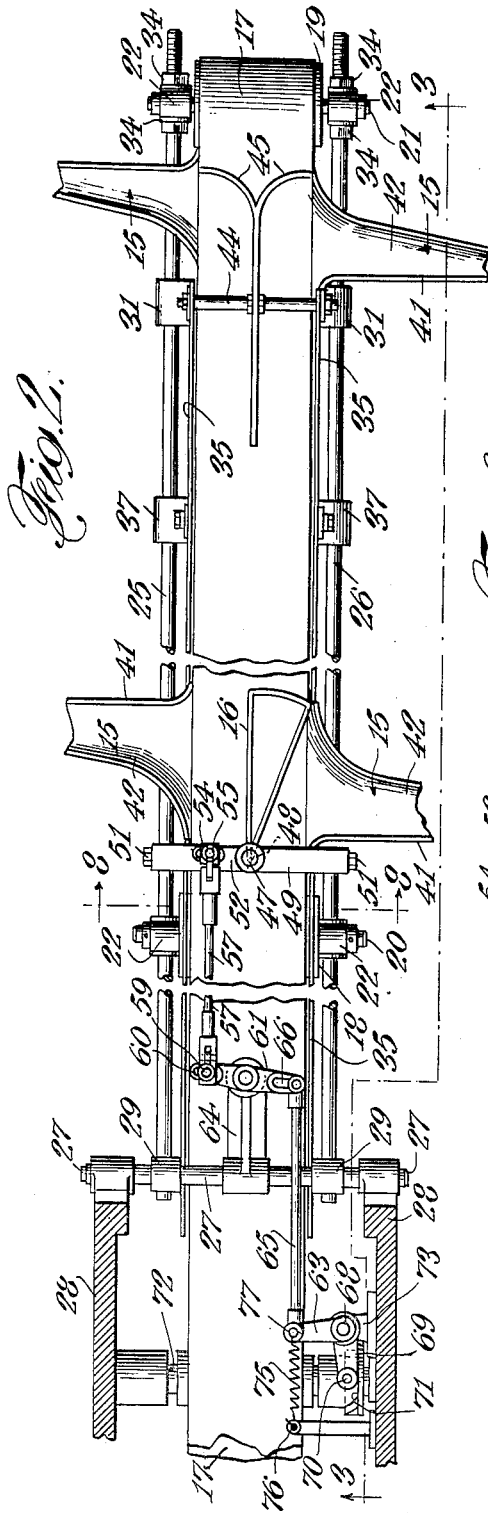
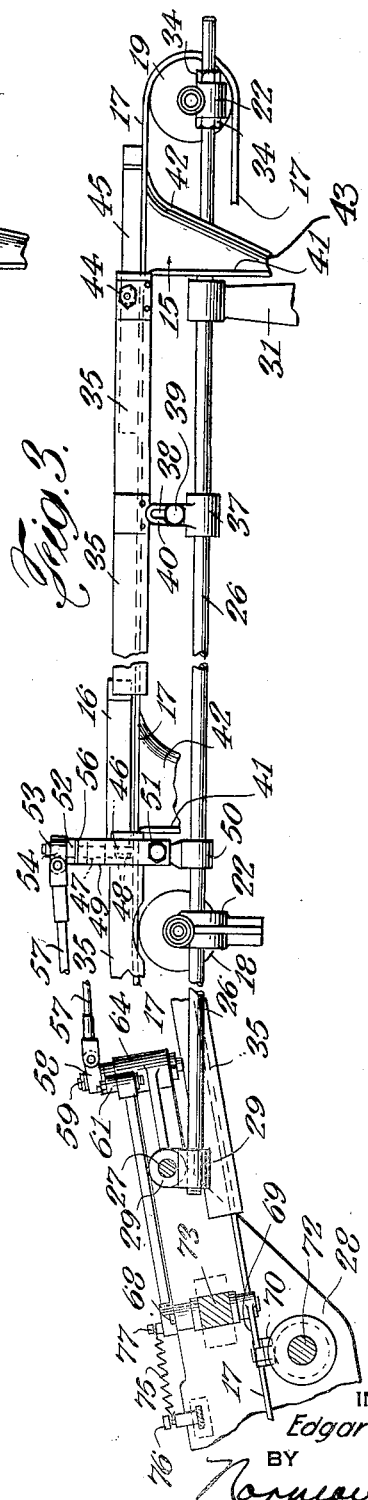
INVENTOR
Edgar Scofield
BY
ATTORNEY

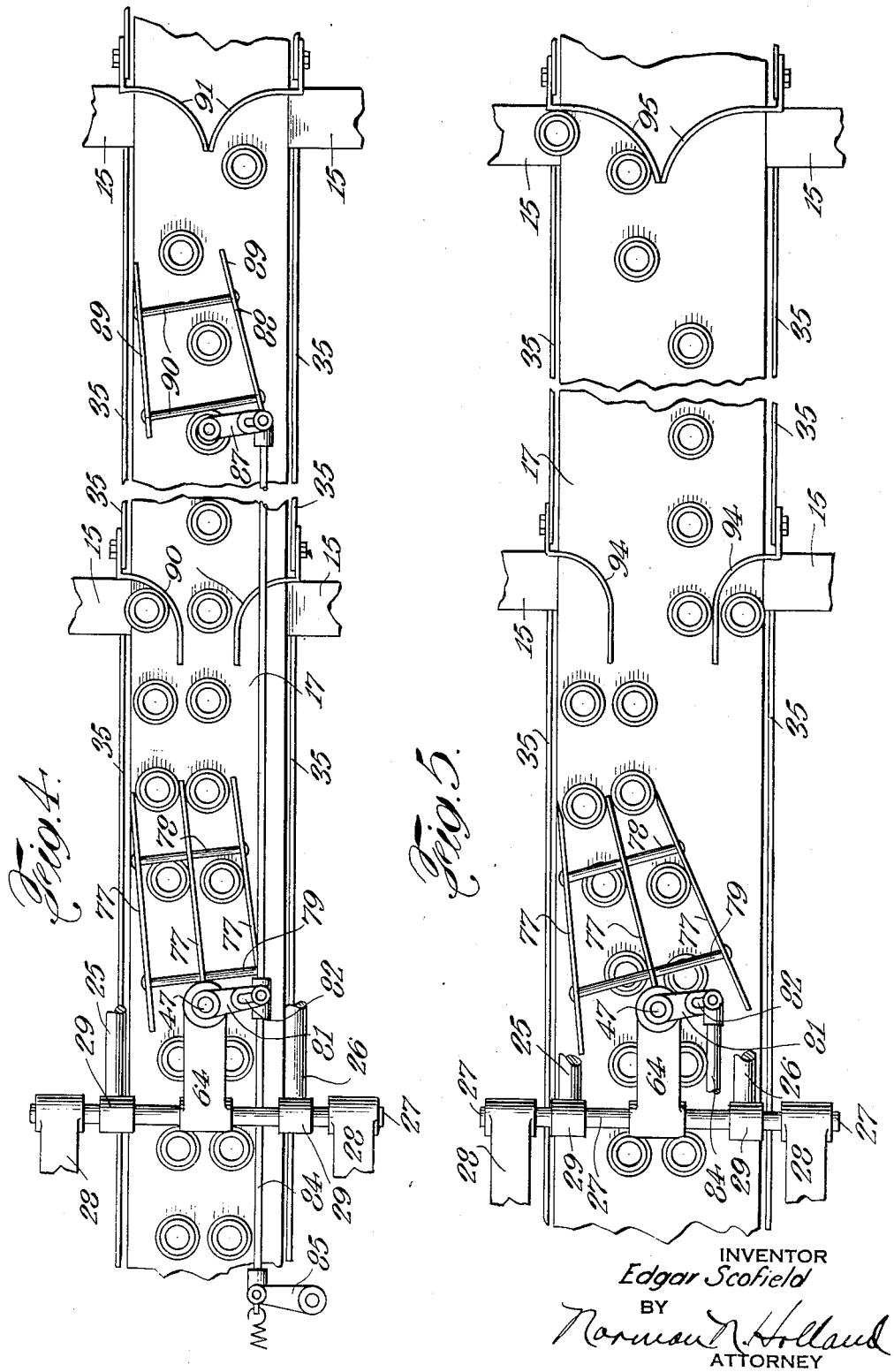

Aug. 22, 1933.  E. SCOFIELD  1,923,752
COMBINED FORMING AND FINISHING MECHANISM
Original Filed June 8, 1926  4 Sheets-Sheet 4
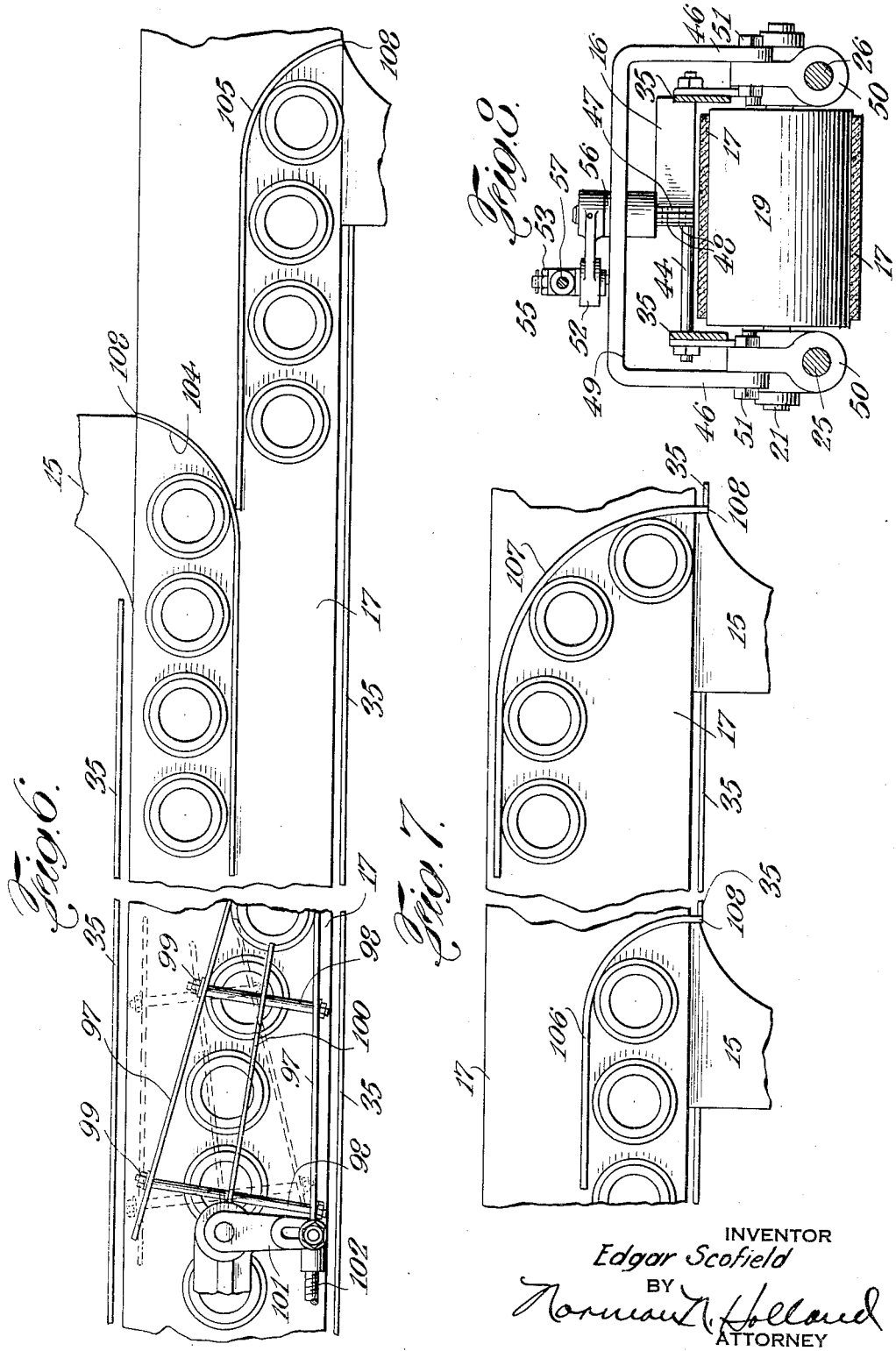
INVENTOR
Edgar Scofield
BY
Norman N. Holland
ATTORNEY Patented Aug. 22, 1933

1,923,752

UNITED STATES PATENT OFFICE 1,923,752

COMBINED FORMING AND FINISHING MECHANISM

Edgar Scofield, New York, N. Y., assignor to Anchor Cap & Closure Corporation, Long Island City, N. Y., a Corporation of New York Original application June 8, 1926, Serial No. 114,518, and in Canada August 7, 1926. Divided and this application December 9, 1932. Serial No. 646,451

21 Claims. (Cl. 153—2)

The present invention relates to combined forming and finishing mechanisms and is a division of application Serial No. 114,518, filed June 8, 1926.

In the manufacture of various articles, it is frequently necessary to have different steps in the manufacture performed by separate machines. For instance, in the manufacture of closure caps, it is customary to stamp the blanks from strips of sheet metal into dish-shaped forms and thereafter run the blanks through threading, beading, or other finishing machines to complete the articles. In many instances, one of the machines may operate at a much lower or higher rate than the other, in which event, it is necessary that both machines be operated at substantially the same rate if they are to be interconnected.

In the manufacture of closure caps, the stamping machine generally discharges blanks at several times the speed that a threading machine can finish them and it has been customary to stamp the blanks, store them in boxes, and later feed them to threading machines. This resulted in extra labor and inefficient operations. The present invention aims to provide an inexpensive and effective means of forming and finishing articles, which is very simple in construction and efficient in operation.

Generally speaking, these advantages are attained by utilizing one or more deflecting means, through which the articles discharged from the forming machine pass in one or more lines or paths and are deflected transversely of a conveyor into a greater number of paths leading to the finishing machines. Preferably, the deflector is oscillated at such a rate that a number of articles are delivered to each path alternately rather than a single article upon each oscillation of the deflector. A plurality of deflectors may be utilized, one to divert the articles on the conveyor into a series of paths and the others further to increase the number of paths to any desired extent. The invention further contemplates the changing of two rows of articles on a conveyor to three or more rows for distribution to the finishing machines.

An object of the present invention is to reduce the cost of manufacturing articles such as closure caps.

Another object of the present invention is to provide a mechanism for manufacturing caps in which the caps discharged from the forming machine are automatically fed to the mechanism for subsequently operating upon them, such as the thread rolling, beading or other finishing machine.

Another object of the invention is to provide an efficient feeding mechanism for receiving caps or the like from one mechanism and distributing them in predetermined quantities to a plurality of devices adapted to perform a subsequent operation upon the caps.

Another object of the invention is to provide combined blank forming and finishing machines and to distribute the blanks to a plurality of finishing machines uniformly and in substantially equal numbers to each machine.

A still further object of the invention is to provide a stamping machine adapted to form a plurality of articles simultaneously, and distributing said articles to a plurality of machines effectively and efficiently, delivering substantially an equal number of articles to each machine.

Other and further objects of the invention will be obvious upon an understanding of the illustrative embodiment about to be described, or will be obvious from the accompanying drawings, or indicated in the appended claims, and various advantages secured by the invention, other than those herein specifically referred to, will occur to one skilled in the art upon employment of the invention in practice.

A preferred embodiment of the invention has been chosen for purposes of illustration and description and is shown in the accompanying drawings, wherein Fig. 1 is a diagrammatic illustration of one embodiment of the invention illustrating a stamping machine and four finishing machines interconnected for the manufacture of articles such as closure caps;

Fig. 2 is a detailed top-plan view of portions of the device shown in Fig. 1;

Fig. 3 is a sectional view of the parts shown in Fig. 2, taken along the line 3—3 thereof, with the conveyor omitted at the left hand portion to illustrate other parts of the device more clearly;

Fig. 4 is a top-plan view of a slightly different construction;

Fig. 5 is a top-plan view of another form of the invention;

Fig. 6 is a detailed view showing a distributing device delivering blanks to two machines on opposite sides of the conveyor;

Fig. 7 is a detailed view showing the device in Fig. 6 distributing blanks to a pair of machines on the same side of the conveyor; and Fig. 8 is a sectional view along the line 8—8 of Fig. 2.

Referring to the drawings, there is shown in Fig. 1 a diagrammatic layout in which a machine 10 delivers articles or blanks 11 to a conveyor 12. The machine may stamp two or more articles simultaneously and deliver them to the conveyor in a number of rows at a rate considerably greater than the capacity of a single finishing machine. In the present case, the machine chosen is adapted to feed four finishing machines 14, by means of suitable chutes 15 leading from the conveyor to the individual machines. Preferably, the chutes are positioned substantially opposite each other so that between the first pair a deflector 16 may be mounted to be oscillated transversely of the conveyor to deflect the blanks of one row into a chute and to permit the blanks in the other row to continue along the same line of movement to the diagonally opposite chute and machine. The oscillations of the deflector may be so timed that a series of four blanks are deflected and allowed to pass in each instance. The chutes are adapted to accommodate several blanks at a time and by utilizing enough finishing machines so that the blanks will be fed thereto at a rate slightly less than their normal capacity, the stamping machine may be run at full speed without the attention of an operator. Further, if there is a slight discrepancy in the proportion of blanks fed to the machines, the extra supply will be taken care of without difficulty. In the manufacture of closure caps, two finishing machines usually absorb the output of a single die stamping machine and four machines the output of a double die stamping machine.

Any suitable type of conveyor, such as that formed by the belt 17 on pulleys 18 and 19, may be utilized. Preferably the conveyor is driven by the stamping machine as a convenience and to maintain its speed in proper relation to the speed of the stamping machine. This may be done by extending the broken ends of the belt 17 (see Fig. 2) about a pulley (not shown) mounted on the drive shaft of the stamping machine. The belt passes under the stamping dies so that the blanks fall on the conveyor belt as they leave the dies. The pulleys 18 and 19 supporting the portions of the belt 17, remote from the machine, may be mounted upon shafts 20 and 21 in bearings 22, suitably fixed to the supporting rods 25 and 26, which may be supported at one end by means of a bar 27 mounted in extensions 28 on the framework of the machine and having suitable seats 29 for the ends of the supporting rods 25 and 26. The other ends of the rods may be mounted on the vertical supports 31. Additional supports, if needed, may be provided intermediate the two points of support shown and described herein. The bearings 22 for the pulley 19 are preferably held in position by nuts 34 which may be moved longitudinally of the rods 25 and 26 to adjust the tension of the belt as desired. Guide rails 35 are provided at the edges of the conveyor belt to prevent the blanks from being deranged in any instance and are mounted upon the rods 25 and 26 by supporting standards 37 provided thereon at suitable intervals. The standards are slotted, as shown at 38, to facilitate an adjustable attachment by means of bolts 39 to the extensions 40 rivetted to the guide rails 35. The chutes 15 may be of any desired form but are here shown having a vertical side portion 41 and an arcuate or inclined flange 42, which provides the bottom and other side of the chutes. The flange 42 slopes or curves downwardly to meet the vertical side 41 in a narrow groove 43 (see Fig. 3) so that the blanks, when deflected onto the chute, will be turned edgewise by the flange 42 as they advance sufficiently far thereon. The guide rails may, in addition to their other functions, serve as supports for small rods 44, mounted thereon by means of suitable nuts to serve as holding means for the guides 45, leading to the chutes 15 for the machines farthest from the stamping machine.

The deflector 16 is mounted between the chutes leading to the first pair of finishing machines and comprises a narrow strip of metal bent into a triangular form with its free ends joined and attached to a suitable pin 47 by means of the bolts 48, extending through the bifurcated end of the pin. Such a deflector furnishes a straight guide for one row of blanks when deflected to one side of the conveyor and diverts the other row of blanks into one of its adjacent chutes. Its operations may be so timed that a predetermined number of blanks, here shown as four, may be fed to the respective machines upon each oscillation thereof. The position of these blanks at various times is illustrated in Fig. 1. A suitable support for the deflector over the center of the conveyor may be formed by inverting a U-shaped member 49 and attaching its free ends 46 to the members 50 on the rods 25 and 26 by means of the bolts 51. A suitable aperture is formed at the center of the bar portion of the member 49 to accommodate the pin 47 attached to the deflector.

An arm 52 is rigidly mounted on the upper end of the pin 47 and slotted at its extremity to receive the bolt 55 upon which the member 54 is rotatably mounted. The bolt 55 may be suitably positioned in the slot by means of the nut 53 to change the effective length of the arm 52 and to control the angle through which the deflector oscillates. A suitable washer 56 may be mounted between the member 49 and the arm 52 about the pin 47 to prevent wear and to provide clearance for movement of the arm. A rod 57, having bifurcated members at its respective ends, is adapted to be pivotally attached to the member 54 at one end and to a similar member 58 at its other end, which is adjustably secured by means of a bolt 59 to a slot 60 in the oscillating lever 61, pivoted at its center portion to the member 64, suitably mounted on the rod 27. The other end of the lever 61 has a rod 65 pivotally and adjustably secured in a slot 66 with its other end attached to an arm 63 mounted on the shaft 68 extending through bearing 73 and having another arm 69 at the lower end thereof with a cam roller 70 thereon in engagement with the cam 71 which is mounted on shaft 72 of the main stamping machine. A spring 75 is anchored to the framework of the machine at 76 and to a pin 77 at the end of the rod 65 to hold the cam roller 70 in engagement with the cam at all times. As the shaft 72 rotates, the deflector 16 is oscillated through the arms 63 and 69, shaft 68, rod 65, pivoted lever 61, rod 57, and member 52, to deflect blanks in one row into one of the adjacent chutes and simultaneously to permit the blanks in the other row to pass along the conveyor to one of the curved guides 45 leading to the chutes for the second pair of finishing machines. In this manner, the deflector directs blanks simultaneously to diagonally opposite pairs of machines alternately to distribute the blank equally to the four machines.

A slightly different form of deflector is shown in Figs. 4, 5 and 6 of the drawings, wherein three strips of metal 77 are held in position by a pair of pins 78 and 79, one of the pins being shorter than the other so that the strips at one end will be separated sufficiently to pass a blank between each pair, while at their other ends they will be substantially further separated to facilitate the entry of the blanks. The pin 47, described hereinbefore with reference to Fig. 2, may be secured to the middle strip 77 for oscillating the deflector. An arm 81 is secured to the upper end of the pin 47 and has a slot 82 in its free end to which the rod 84 is adjustably secured. One end of the rod 84 is attached to the arm 85, operatively connected to a suitable cam, as described hereinbefore, and its other end is adjustably attached to an arm 87 operatively connected to the deflector 88, which is formed by two strips of metal 89 held in position by pins 90 riveted thereto and adapted to accommodate a single row of blanks.

The two rows of blanks are delivered to the conveyor by any suitable machine, one row passing through one side of the deflector and the other row through the other side thereof. The cam operating the deflector is so shaped that it oscillates the deflector alternately from one side of the conveyor to the other, permitting it to remain in its extreme position on each side of the conveyor sufficiently long for four blanks to pass through each side thereof. The width of the belt 17 is such that it will accommodate three rows of blanks adjacent each other, and the deflector when it moves to one side, diverts the two rows of blanks as near that side as possible, making one of them adjacent the edge of the belt which continues in this position until it reaches the curved guides 90 leading into one of the chutes 15. The other row of blanks diverted to the center of the belt is a continuous row, since, if one side of the deflector is not delivering caps thereto, the other is, and the blanks in this row are passed straight along the center of the conveyor until they reach the deflector 88, which operates simultaneously with the other deflector to divert four blanks into one of the adjacent chutes 16 and then four into the other, alternately. The curved guides 91 receive the blanks as they are delivered from the deflector. In this manner, a belt which is sufficiently wide to accommodate three rows of caps may be readily utilized for feeding four machines.

In the embodiment of the invention shown in Fig. 5, the belt 17 is sufficiently wide to accommodate four rows of caps. The curved guides 94 extend substantially one-quarter of the way across the respective edges of the belt to direct the outside rows of caps into the chutes leading to the first pair of operating machines. Further along the conveyor a second pair of curved guides 95 is provided adjacent the second pair of finishing machines with their inner ends joined at substantially the center portion of the belt so that the two rows of blanks which pass between the guides 94 are diverted by the second pair of guides 95 into the chutes leading to the second pair of finishing machines. The operation of the deflector is similar to the operation of the first deflector, described in Fig. 4, but the belt being wider instead of forming three rows of blanks when oscillated from one side to the other of the conveyor, forms four rows and the location and position of the guides 94 and 95 eliminate the necessity for the second deflector, shown in Fig. 4.

With single die types of stamping machines, a pair of finishing machines may be used and the blanks delivered to the conveyor in a single row. Embodiments of the invention particularly applicable to this type of machine are shown in Figs. 6 and 7, wherein an apparatus is provided to deflect the blanks to two machines whether positioned on the same side of the conveyor or on opposite sides thereof. The deflector is somewhat similar to that shown and described hereinbefore in that a pair of strips of metal 97 are held in position at their respective ends by the bolts 98 and nuts 99. The pin 47 is secured to a central strip 100 attached to the central portions of the bolts 98 and an upper arm 101 is attached to the pin, as described hereinbefore, and secured to a rod 102, operatively connected to a cam driven by the main operating machine. The single row of blanks delivered to the conveyor is diverted alternately from one side to the other and a number, here shown as four, permitted to pass during each oscillation of the deflector. These blanks continue along the conveyor at the respective sides thereof until they engage the curved guide 104 or 105, which diverts the blanks into the chutes leading to the machines on the respective sides of the conveyor. In Fig. 7, guide 106 extends to the center of the conveyor while guide 107 extends substantially across the conveyor, whereby two machines on the same side of the conveyor may be readily fed by the deflector shown in Fig. 6. Preferably, the curved guides are so shaped and positioned that the blanks follow their contour and revolve about their ends 108 as a pivot in moving from the conveyor into the chutes, thereby preventing any tendency of the caps to become inverted or to enter the chutes improperly. The operation of the various deflectors may be adjusted by positioning the operating rods in the slots through which they are connected to the deflectors.

It will be seen that a very effective apparatus has been provided for combining a forming machine with a number of finishing machines, whereby articles may be delivered directly from one stamping machine to a series of machines instead of being stored and fed independently to the machines operating more slowly. The attendance of an operator is completely eliminated by having the operating capacity of the slower machines collectively greater than the operating capacity of the fast machine. Further, the apparatus is simple in construction and may be readily manufactured from commercial parts and is fully capable of withstanding the rough usage to which it may be subjected.

As various changes may be made in the above embodiment without departing from the spirit and scope of the invention, and without sacrificing any of its advantages, it is to be understood that all matter herein set forth is to be taken as illustrative and not in a limiting sense.

Having thus described my invention, I claim:

1. The combination of a cap forming mechanism adapted to discharge unfinished caps, a plurality of thread rolling devices of predetermined capacities adapted to roll threads on said caps, and means for automatically dividing the caps discharged from said mechanism and feeding them to said devices in accordance with their capacities.

2. The combination of a cap forming mechanism adapted to discharge unfinished caps, a plurality of thread rolling devices adapted to roll threads on said caps, and means for automatically dividing the caps discharged from said mechanism and feeding them to said devices in predetermined amounts.

3. In a mechanism of the class described, the combination of a conveyor, a mechanism adapted to discharge unfinished articles to said conveyor and operatively connected to the conveyor for driving the same, a plurality of devices adapted to receive said articles from the conveyor and perform a subsequent operation upon the articles and means for dividing said articles as they pass along said conveyor and for directing the articles in predetermined proportions to said devices.

4. In a mechanism of the class described, the combination of a conveyor, mechanism adapted to discharge unfinished articles to said conveyor whereby upon the continuous movement of the conveyor the articles are carried in line on the conveyor, a plurality of devices adapted to receive said articles from the conveyor and perform a subsequent operation upon the articles, and a guide member movable over said conveyor for dividing said line of articles into a plurality of lines of predetermined numbers of articles.

5. In a mechanism of the class described, the combination of a conveyor, a mechanism adapted to discharge unfinished articles to said conveyor, means for driving said mechanism and simultaneously operating said conveyor, a plurality of devices adapted to receive said articles from the conveyor and perform a subsequent operation upon them, and means operable in accordance with the travel of the conveyor for dividing said articles as they pass along the conveyor and for directing the articles in predetermined proportions to said devices.

6. In a mechanism of the class described, the combination of a conveyor, mechanism adapted to discharge unfinished articles to said conveyor whereby upon the continuous movement of the conveyor the articles are carried in line on the conveyor, a plurality of devices adapted to receive said articles from the conveyor and perform a subsequent operation upon the articles, and a movable guide member driven by said conveyor for dividing said line of articles into a plurality of lines of predetermined numbers of articles.

7. In a mechanism of the class described, the combination of a conveyor, mechanism adapted to discharge unfinished articles to said conveyor whereby upon the continuous movement of the conveyor the articles are carried thereon, a plurality of devices adapted to receive articles from the conveyor and perform a subsequent operation upon the articles, means for apportioning the articles on the conveyor for the respective devices, and means for delivering the articles thus apportioned to each of the respective devices in a plane at an angle to that of the conveyor.

8. In a mechanism of the class described, the combination of a conveyor, cap forming mechanism adapted to discharge unfinished caps to said conveyor whereby upon the continuous movement of the conveyor the caps are carried thereon, a plurality of devices adapted to receive caps from the conveyor and perform a subsequent operation upon the caps, means for apportioning the caps on the conveyor for the respective devices, and means for delivering the caps thus apportioned to each of the respective devices in a plane at an angle to that of the conveyor.

9. In a mechanism of the class described, the combination of a conveyor, a mechanism adapted to discharge unfinished caps to said conveyor and operatively connected to the conveyor for driving the same, a plurality of devices adapted to receive said caps from the conveyor and perform a subsequent operation upon the caps and means for dividing said caps as they pass along said conveyor and for directing the caps in predetermined proportions to said devices.

10. In a mechanism of the class described, the combination of a conveyor, mechanism adapted to discharge unfinished caps to said conveyor whereby upon the continuous movement of the conveyor the caps are carried in line on the conveyor, a plurality of devices adapted to receive said caps from the conveyor and perform a subsequent operation upon the caps, and a guide member movable over said conveyor for dividing said line of caps into a plurality of lines of predetermined numbers of caps.

11. In a mechanism of the class described, the combination of a conveyor, a mechanism adapted to discharge unfinished caps to said conveyor, means for driving said mechanism and simultaneously operating said conveyor, a plurality of devices adapted to receive said caps from the conveyor and perform a subsequent operation upon them, and means operable in accordance with the travel of the conveyor for dividing said caps as they pass along the conveyor and for directing the caps in predetermined proportions to said devices.

12. In a mechanism of the class described, the combination of a conveyor, mechanism adapted to discharge unfinished caps to said conveyor whereby upon the continuous movement of the conveyor the caps are carried in line on the conveyor, a plurality of devices adapted to receive said caps from the conveyor and perform a subsequent operation upon the caps, and a movable guide member driven by said conveyor for dividing said line of caps into a plurality of lines of predetermined numbers of articles.

13. In a mechanism of the class described, the combination of a conveyor, a forming mechanism adapted to discharge unfinished caps to said conveyor and operatively connected to the conveyor for driving the same, a plurality of devices adapted to receive said unfinished caps from the conveyor and perform a subsequent operation upon the caps, and means for dividing said caps as they pass along said conveyor and for directing the caps in predetermined proportions to said devices.

14. In a mechanism of the class described, the combination of a conveyor, a cap forming mechanism adapted to stamp blanks from a sheet of material and to discharge said unfinished caps to said conveyor, means for driving said mechanism and simultaneously operating said conveyor, a plurality of devices adapted to receive said caps from the conveyor and perform a subsequent operation upon them, and means operable in accordance with the travel of the conveyor for dividing said caps as they pass along the conveyor and for directing the caps in predetermined proportions to said devices.

15. The combination of a cap forming mechanism adapted to discharge a plurality of unfinished caps simultaneously onto a conveyor, forming two rows of caps thereon, a plurality of thread rolling devices of predetermined capacities adapted to roll threads on said caps, and means for automatically dividing the caps discharged from said mechanism and feeding them to said devices in accordance with their capacities.

16. In a mechanism of the class described, the combination of a conveyor, cap forming mechanism adapted to discharge a plurality of unfinished caps simultaneously to said conveyor whereby, upon the continuous movement of the conveyor, caps are carried thereon in a plurality of rows, a plurality of devices adapted to receive caps from the conveyor and perform subsequent operations upon the caps, means for apportioning the caps on the conveyor for the respective devices, and means for delivering the caps thus apportioned to each of the respective devices in a plane at an angle to that of a conveyor.

17. The combination of a cap forming mechanism adapted to discharge a plurality of unfinished caps simultaneously, a plurality of thread rolling devices of predetermined capacities adapted to roll threads on said caps, a conveyor for receiving said unfinished caps in a plurality of rows thereon, a deflector operatively connected to said cap forming machine and effective upon said rows of blanks to deflect blanks from each of said rows to substantially the center of said conveyor, and a second deflector effective upon certain of said blanks to deflect them into a plurality of additional paths, whereby said unfinished caps discharged from said forming mechanism are divided and fed to said threading devices in accordance with their capacities.

18. In a mechanism of the class described, the combination of a conveyor for receiving unfinished articles in a pair of rows thereon, a mechanism adapted to discharge unfinished articles to said conveyor in a pair or rows and operatively connected to the conveyor for driving the same, a plurality of devices adapted to receive said articles from the conveyor and perform a subsequent operation upon the articles, and means for dividing said pair of rows into three rows of articles and for directing the articles in predetermined proportions to said devices.

19. In a mechanism of the class described, the combination of a conveyor for receiving unfinished articles in a pair of rows, a mechanism adapted to discharge unfinished articles to said conveyor in a pair of rows, and operatively connected to the conveyor for driving the same, a plurality of devices adapted to receive said articles from the conveyor and perform a subsequent operation upon the articles, a deflector effective upon each of said rows to alternately deflect the articles therein into the center row, whereby a continuous row of articles is formed at the center of the conveyor and interrupted rows of articles are formed on each side of the conveyor, and a second deflector adapted to deflect said center row of articles into two paths to divide said articles as they pass along said conveyor and for directing the articles in predetermined proportions to a pair of said devices.

20. In a mechanism of the class described, the combination of a conveyor, a cap forming mechanism adapted to discharge unfinished caps to said conveyor, whereby upon the continuous movement of the conveyor, caps are carried thereon, four devices adapted to receive caps from the conveyor and perform a subsequent operation upon the caps, means for apportioning the caps on the conveyor for the respective devices, and means for delivering the caps thus apportioned to each of the respective devices in a plane at an angle to that of the conveyor.

21. The combination of a cap forming mechanism adapted to discharge unfinished caps, four thread rolling devices of predetermined capacities adapted to roll threads on said caps, and means for automatically dividing the caps discharged from said mechanism and feeding them to said devices in accordance with their capacities.

EDGAR SCOFIELD.